(12) United States Patent
Theis et al.

(10) Patent No.: US 10,485,083 B2
(45) Date of Patent: Nov. 19, 2019

(54) DISCHARGE DEVICE AND METHOD FOR DISCHARGING ELECTROSTATIC CHARGES

(71) Applicant: Schunk Bahn— und Industrietechnik GmbH, Wettenberg (DE)

(72) Inventors: Lothar Theis, Bischoffen (DE); Daniel Pfeffer, Muecke (DE); Frank Burkard, Neustadt (DE)

(73) Assignee: SCHUNK BAHN— UND INDUSTRIETECHNIK GMBH, Wettenberg (DE)

( * ) Notice: Subject to any disclaimer, the term of this patent is extended or adjusted under 35 U.S.C. 154(b) by 308 days.

(21) Appl. No.: 15/467,606

(22) Filed: Mar. 23, 2017

(65) Prior Publication Data

US 2017/0280540 A1    Sep. 28, 2017

(30) Foreign Application Priority Data

Mar. 24, 2016  (DE) .................. 10 2016 205 049

(51) Int. Cl.
*H05F 3/04*     (2006.01)
*F16C 41/00*    (2006.01)
(Continued)

(52) U.S. Cl.
CPC ............... *H05F 3/04* (2013.01); *F16C 19/52* (2013.01); *F16C 41/002* (2013.01);
(Continued)

(58) Field of Classification Search
CPC .. H05F 3/04; F16C 19/06; F16C 19/52; F16C 41/002; H01R 13/6485; H01R 39/643
(Continued)

(56) References Cited

U.S. PATENT DOCUMENTS

| 5,885,683 A * | 3/1999 | Swift ..................... H01R 39/24 428/88 |
| 2011/0287336 A1* | 11/2011 | Himeno .............. H01M 8/0213 429/492 |

(Continued)

FOREIGN PATENT DOCUMENTS

| DE | 1228689 B | 11/1966 |
| DE | 19824022 A1 | 12/1999 |

(Continued)

OTHER PUBLICATIONS

Machine translation of Taniyama Japanese Patent Document JP H11-218143 A Aug. 10, 1999 (Year: 1999).*

(Continued)

*Primary Examiner* — Kevin J Comber
(74) *Attorney, Agent, or Firm* — Quarles & Brady LLP

(57) ABSTRACT

A discharge device for a rolling bearing as well as a method for discharging electrostatic loads to a rolling bearing including a flexurally elastic conductor. The conductor includes a first conductor section and a second conductor section for forming a contact arrangement at a rolling bearing. The first conductor section electrically engages a first bearing ring and the second conductor section electrically engages a second bearing ring of the rolling bearing to form an electrically conductive connection between the first bearing ring and the second bearing ring.

23 Claims, 5 Drawing Sheets

(51) Int. Cl.
*F16C 19/52* (2006.01)
*H01R 13/648* (2006.01)
*H01R 39/64* (2006.01)
*F16C 19/06* (2006.01)

(52) U.S. Cl.
CPC ....... *H01R 13/6485* (2013.01); *H01R 39/643* (2013.01); *F16C 19/06* (2013.01)

(58) Field of Classification Search
USPC .......................................................... 361/221
See application file for complete search history.

(56) References Cited

U.S. PATENT DOCUMENTS

| | | | |
|---|---|---|---|
| 2014/0334758 | A1 | 11/2014 | White |
| 2017/0276179 | A1* | 9/2017 | Hutchison ............. F16C 33/583 |

FOREIGN PATENT DOCUMENTS

| | | |
|---|---|---|
| DE | 29916854 U1 | 1/2000 |
| DE | 10110067 A1 | 9/2002 |
| DE | 102014204719 A1 | 11/2014 |
| DE | 102013217980 A1 | 3/2015 |
| DE | 102013225939 A1 | 6/2015 |
| DE | 102014112561 A1 | 3/2016 |
| EP | 0475841 A1 | 3/1992 |
| JP | 2540952 | 7/1996 |
| JP | H081196 U | 7/1996 |
| JP | H1182492 A | 3/1999 |
| JP | H11218143 A | 8/1999 |
| WO | 2009052798 A1 | 4/2009 |
| WO | 2015032989 A2 | 3/2015 |

OTHER PUBLICATIONS

Machine translation of Krug et al. German Patent Document DE 10110067 A1 Sep. 5, 2002 (Year: 2002).*
Machine translation of Mensch et al. German Patent Document DE 102013217980 A1 Mar. 26, 2015 (Year: 2015).*
European Patent Office, Search Report, Application No. 17159759.4, dated Sep. 11, 2017, 5 pages.

* cited by examiner

DISCHARGE DEVICE AND METHOD FOR DISCHARGING ELECTROSTATIC CHARGES

CROSS-REFERENCE TO RELATED APPLICATIONS

This application claims the benefit of German Patent Application No. 10 2016 205 049.4 filed Mar. 24, 2016. The contents of which is hereby incorporated by reference as if set forth in its entirety herein.

STATEMENT REGARDING FEDERALLY SPONSORED RESEARCH OR DEVELOPMENT

Not applicable.

FIELD OF THE INVENTION

The invention relates to a discharge device for rolling bearings as well as to a method for discharging electrostatic charges at a rolling bearing.

BACKGROUND OF THE INVENTION

A discharge device for a shaft is known from WO 2015/032989 A2, said shaft comprising a flexurally elastic conductor made of a carbon fiber arrangement. The conductor is mounted to a holder, which is positioned relative to the shaft in such a manner that the conductor can rest on the shaft by forming an initial load. Thus, it becomes possible to discharge an electrostatic charge of the shaft via the conductor. The shaft can consequently be grounded via the conductor.

A disadvantage of the known discharge devices is that they have to always be installed adjacent to the shaft using a holder. Hence, there must always be sufficient installation space present for mounting the holder in conjunction with the conductor in the area of the shaft. Depending on the type of usage intended for the shaft, in particular when the shaft is mounted by means of rolling bearings, electrostatic charges can also be discharged from the shaft via the rolling bearings. These currents can also be discharged via the rolling bearings when a discharge device is arranged at the shaft at a distance to the rolling bearings. It has proven that a passage of electric current through a rolling bearing leads to progressing wear of the bearing rings and balls with increasing service life. In particular pittings as well as grooves can be observed at the bearing rings.

Using either ceramic or ceramically coated balls as insulators and/or electrically conductive grease in lubricated bearings is also a known technique for discharging vagrant currents. A transition resistance of the grease is then adjusted in such a manner that a current is no longer discharged via the balls but via the grease instead. A disadvantage of the conductive grease is its reduced lubrication properties, which results from adding conductive particles. Furthermore, the conductive grease can be negatively altered by high thermal stress and a passage of electric current. Occurring vagrant currents, for example, can decompose the grease via large fluctuations in temperature, thus making the grease useless. The grease's viscosity is also reduced by adding conductive particles.

SUMMARY OF THE INVENTION

Therefore, it is the object of the invention to propose a discharge device as well as a method for discharging electrostatic charges, which prolongs the service life of rolling bearings.

This object is attained by a discharge device, a rolling bearing, a method and a usage of a discharge device, all of which are described herein.

The discharge device for a rolling bearing according to the invention comprises a flexurally elastic conductor, which comprises a first conductor section and a second conductor section for forming a contact arrangement at a rolling bearing, said first conductor section being formed for contacting a first bearing ring and said second conductor section being formed for contacting a second bearing ring of the rolling bearing, an electrically conductive connection being able to be formed between the first bearing ring and the second bearing ring by means of the conductor.

A first contact area of the first conductor section of the conductor can rest on the first bearing ring and the second conductor section can rest on a second contact area at the second bearing ring. Thus, an electrically conductive connection can be formed between the first bearing ring and the second bearing ring via the conductor. Simultaneously, it becomes possible to electrically bridge balls of the rolling bearing, which are arranged between the first bearing ring and the second bearing ring, using the conductor so that currents essentially flow along the conductor instead of along the balls, whereby the abovementioned damaging of the bearing rings can be mostly averted. Since at least one bearing ring is in constant contact with a shaft, it is no longer necessary to separately arrange a conductor at a shaft using a holder, whereby less installation space is required. Generally, the conductor can be made of any material having conductive properties, such as a metal or a material composition, for example.

The first conductor section and the second conductor section can be connected to each other so as to form one piece via a connecting section. The connecting section can then bridge a distance or a gap between the first bearing ring and the second bearing ring, in which the balls are arranged. Preferably, the conductor can be formed in one piece. The discharge device can then be formed solely via the conductor.

An initial load can be formed in the conductor, which can be arranged between the first bearing ring and the second bearing ring by forming the initial load. In particular, the conductor can form an initial load in an axial and/or radial direction, relative to a rolling bearing axis. The conductor can comprise physical dimensions or a geometric shape, which are different to the physical dimensions or a shape of the first bearing ring and/or the first bearing ring. The discharge device can be 10 to 50% larger than the first bearing ring, for example, and/or smaller than the second bearing ring in radial bearings, and 10 to 50% larger than a bearing ring distance in thrust bearings. If the conductor is then arranged at the first bearing ring and the second bearing ring, the flexurally elastic conductor can be shaped differently enough so that the conductor rests on the corresponding contact area at the first bearing ring and/or the second bearing ring under an initial load. The conductor is thus pressed to the first bearing ring and the second bearing ring using contact pressure, whereby a particularly secure electrically conductive connection, can be formed between the first bearing ring and the second bearing ring.

The roller bearing can be a thrust bearing, which can entail an axial deep-groove ball bearing, an axial cylindrical roller bearing, an axial spherical roller bearing, an axial angular-contact roller bearing or an axial taper roller bearing.

The rolling bearing can also be a radial bearing and the conductor can comprise an external conductor section as a first conductor section and an internal conductor section as a second conductor section for forming the contact arrangement at the radial bearing, said external conductor section being able to be formed for contacting an outer ring as a first bearing ring and the internal conductor section being able to be formed for contacting an inner ring as a second bearing ring of the radial bearing, said electrically conductive connection being able to be formed between the outer ring and the inner ring by means of the conductor. A radial bearing can entail a deep groove ball bearing, an angular-contact ball bearing, a four-point-contact bearing, a separable ball bearing, a self-aligning ball bearing, a cylindrical roller bearing, a tapered roller bearing, a barrel roller bearing, a spherical roller bearing, a needle bearing, a toroidal roller bearing, a ball roller bearing or a Y-bearing.

It is advantageous if the conductor is arranged between the inner ring and the outer ring, the external conductor section being able to be formed for contacting an inner circumference of the outer ring and the internal conductor section being able to be formed for contacting the outer circumference of the inner ring. By arranging the conductor entirely between the inner ring and the outer ring, essentially no installation space is required for arranging the discharge device. Hence, an existing rolling bearing, for example, can also be simply replaced by a rolling bearing having the discharge device or the conductor, respectively. The conductor can be arranged adjacent to a rolling bearing cage or, in the event that the rolling bearing has two rows, in the center of the bearing between the rows of balls. Furthermore, the conductor can be clamped particularly well between the inner ring and the outer ring.

The conductor can be formed for contacting contact areas of the inner ring and the outer ring, said contact areas being arranged in a bearing contact plane. Consequently, the conductor can be formed to be entirely flat, i.e. lying entirely in the bearing contact plane. The contact areas of the inner ring and the outer ring also lie within the bearing contact plane. The conductor can thus be formed more easily.

Advantageously, at least one conductor section can be inserted in a radial groove formed in the outer ring or the inner ring. This effectively prevents the conductor from inadvertently moving relative to a longitudinal axis of the rolling bearing. The groove can also secure the conductor insofar that the conductor cannot fall out of the groove. Depending on the width of the groove and the width of the conductor, the conductor can be inserted movably in the groove. It is particularly advantageous if the rolling bearing already comprises the groove. Rolling bearings are known which comprise grooves for receiving snap rings or, similar. A shape and a width of the conductor can therefore already be adjusted to such a groove. Generally, the conductor can comprise a conductor cross section, which is square, rectangular, elliptic or round in shape. The conductor cross section can also change or be changed along a length of the conductor, depending on the requirements regarding a bending elasticity or an electric resistance.

The conductor can comprise an at least arcuately formed conductor section, which rests on the inner circumference and/or the outer circumference. For this purpose, it suffices if only sections of the conductor are formed arcuately. A diameter of the arc can be greater than or equal to a diameter of the inner circumference or lesser than or equal to a diameter of the outer circumference. Such a conductor can simply be preformed by being wound around a mandrel and thus simply be produced in larger quantities. Furthermore, a particularly large contact surface or contact area, respectively, is created at the inner circumference and/or outer circumference, which permits safely transmitting current.

In one embodiment, the conductor can be U-shaped. It can also be intended for the conductor to be V-shaped.

The conductor can be formed symmetric having two external conductor sections and one internal conductor section or having one external conductor section and two internal conductor sections. Thus, at, least three contact areas of the contact arrangement can be formed, which in turn results in improved contacting of the conductor to the bearing rings.

The internal conductor section can be arranged tangential to the outer circumference. In particular, the internal conductor section does not have to be adjusted to a shape of the outer circumference or a diameter of the internal ring, respectively.

Furthermore, the conductor can be shaped helical. The helical shape of the conductor allows easily forming an initial load without having to observe specific accuracy requirements regarding the helical shape.

Alternatively, the conductor can also be shaped like a wave. This allows forming a plurality of contact areas on the inner ring and the outer ring, respectively, and to thus form several conductor connections of the inner ring and the outer ring using only one conductor.

Consequently, two, preferably three, particularly preferably four or more, conductor sections can be formed for contacting contact areas which are each distanced to each other and arranged in the direction of the circumference. The contact areas can be distanced from each other at equal distances.

At least one conductor section can be formed in such a manner that the conductor section can be extracted from the rolling bearing and be contacted to another conductor. The conductor section can then be connected to the cable or the other conductor, respectively, for being grounded or for discharging charges. Thus, high-frequency signals can also be systematically discharged. Using a conductor made of several fine individual wires can be advantageous regarding the increasing resistance in alternating voltages when frequencies increase.

The conductor can be made of a carbon fiber arrangement, which can comprise a fiber braid, a fiber felt and/or a fiber mat, which can be provided with a coating made of pyrolytically deposited carbon. The conductor can essentially be made of carbon fibers, which form a fiber braid, a fiber felt and/or a fiber mat, which can be coated with pyrolytic carbon. The carbon fibers can be fixed in a desired shape by means of the coating formed by pyrolytic carbon. The conductor can be formed by shaping the fiber braid or by cutting the conductor out of the fiber braid, for example out of a panel. The conductor is then essentially stiff but still sufficiently flexurally elastic. As a consequence of the contact arrangement, the bearing rings do not wear as quickly since an advantageous coefficient of friction is yielded at the corresponding contact areas by making the conductor of carbon material.

The carbon fiber arrangement can be formed as a casing of a unidirectional fiber strand extending in the longitudinal direction of the conductor. The unidirectional fiber strand then comprises filaments extending essentially parallel to each other so that capillaries are formed by the fiber spaces, said capillaries allowing removing grease from the contact areas using capillary action.

The carbon fiber arrangement can comprise a rectangular, a polygonal or an elliptic cross section, said carbon fiber arrangement being made of a tube-like braid, a tube-like band or as a cutting out of a form-stable fabric panel. The form-stable fabric panel can already be coated with pyrolytic carbon, for example.

For increasing the bending flexibility of the conductor, it is advantageous if the carbon fiber arrangement is provided with a resin matrix.

The carbon fiber arrangement can be provided with a coating for decreasing a coefficient of friction. This coating can be molybdenum sulfide, PTFE, antimony etc. and can either infiltrate or fill the carbon fiber arrangement.

The CVI method (chemical vapor infiltration) can be used for coating the carbon fiber arrangement or the fiber braid, respectively, with pyrolytically deposited carbon since this method provides not only the desired surface coating but also the binding force between the individual filaments of the fiber braid.

The rolling bearing according to the invention comprises a discharge device according to the invention. Further advantageous embodiments of the rolling bearing can be taken from the description of features of the dependent claims referring to the device claim 1.

In the method according to the invention for discharging electrostatic charges at a rolling bearing having a rolling bearing and a flexurally elastic conductor, the conductor is formed having a first conductor section and a second conductor section, which form a contact arrangement at the rolling bearing, said first conductor section being arranged at a first bearing ring and the second conductor section being arranged at a second bearing ring of the rolling bearing in such a manner that an electrically conductive connection can be formed between the first bearing ring and the second bearing ring by means of the conductor. The advantageous description of the discharge device is referred to regarding the advantageous effect of the discharge device according to the invention. The advantageous embodiments of the method can be taken from the description of features of the dependent claims referring to the device claim 1.

According to the invention, the discharge device according to the invention is used for producing a rolling bearing having a first bearing ring, a second bearing ring and balls arranged between the bearing rings, an electrically conductive connection being formed between the first bearing ring and the second bearing ring by means of a conductor. Advantageous embodiments of the usage of the discharge device can be taken from the description of features of the dependent claims referring to the device claim 1.

In the following, preferred embodiments of the invention are further described by way of the attached drawing.

BRIEF DESCRIPTION OF THE DRAWINGS

In the figures.

DETAILED DESCRIPTION OF THE EXAMPLE EMBODIMENTS

Figure 1:
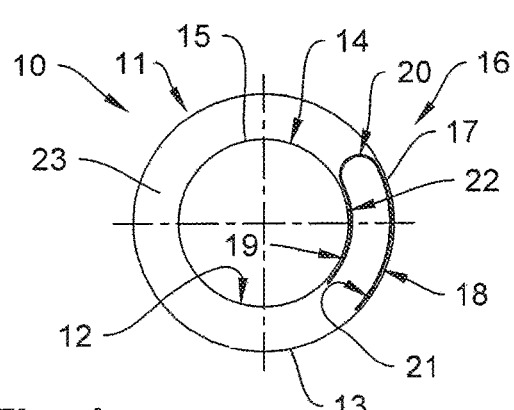
FIG. 1 shows a rolling bearing having a first embodiment of a discharge device.

FIGS. 1 to 9 each show different embodiments of discharge devices in a schematically simplified manner. In each instance, a rolling bearing 10 is formed as a radial bearing and is shown having solely, an inner circumference 12 of an outer ring 13 as well as an outer circumference 14 of an inner ring 15 without balls being indicated.

FIG. 1 shows a first embodiment of a discharge device 16 formed from a conductor 17. The conductor 17 is made of a carbon fiber arrangement, which is not further shown and comprises a fiber braid coated with pyrolytically deposited carbon. The conductor 17 is therefore formed flexurally elastic. In particular, the conductor 17 has an external conductor section 18 and an internal conductor section 19. The external conductor section 18 and the internal conductor section 19 are connected to each other via a connecting section 20 so as to form one piece. The external conductor section 18 rests on the inner circumference 12 of the outer ring 13 and forms a contact area 21 at the outer ring 13. The internal conductor section 19 rests on the outer circumference 14 of the inner ring 15 and forms a contact area 22 of the inner ring. The external conductor section 18 and an internal conductor section 19 are each formed arcuately and are connected to each other via the connecting section 20, which is also formed arcuately and bridges a bearing gap 23 between the outer ring 13 and the inner ring 15. The connecting section 20 is formed in such a manner that an initial load can be formed between the external conductor section 18 and the internal conductor section 19 and a pressing force consequently acts on each of the contact areas 21 and 22. The conductor can thus form an electrically conductive connection between the outer ring 13 and the inner ring 15, said connection being nearly wear-free and cost-efficient.

Figure 2:
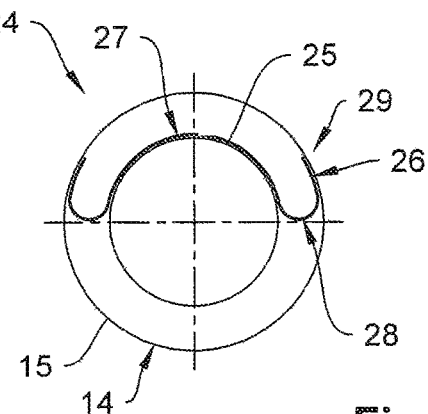
FIG. 2 shows a rolling bearing having a second embodiment of a discharge device.

FIG. 2 shows a second embodiment of a discharge device 24 having a conductor 25, which comprises two external conductor sections 26, an internal conductor section 27 and two connecting sections 28. The external conductor section 26 are each formed at ends 29 of the conductor 25, the internal conductor section 27 being arranged between the connecting sections 28. The connecting section 28 in particular is formed arcuately and rests entirely on the outer circumference 14 of the inner ring 15.

Figure 3:
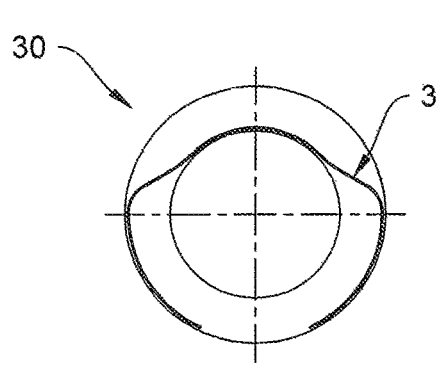
FIG. 3 shows a rolling bearing having a third embodiment of a discharge device.

A third embodiment of a discharge device 30 is shown in FIG. 3, with there being straight connecting sections 31 as compared to the embodiment shown in FIG. 2.

Figure 4:
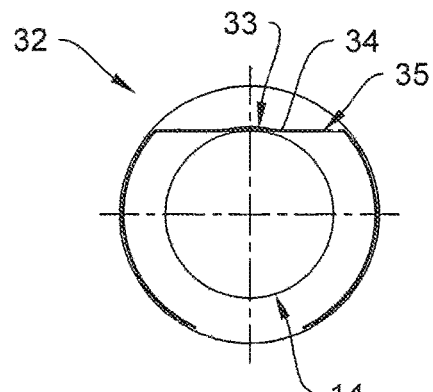
FIG. 4 shows a rolling bearing having a fourth embodiment of a discharge device.

A fourth embodiment of a discharge device 32 is shown in FIG. 4, with there being an internal conductor section 33 of a conductor 34 in conjunction with connecting sections 35, all straight in form and tangentially resting on the outer circumference 14.

Figure 5:
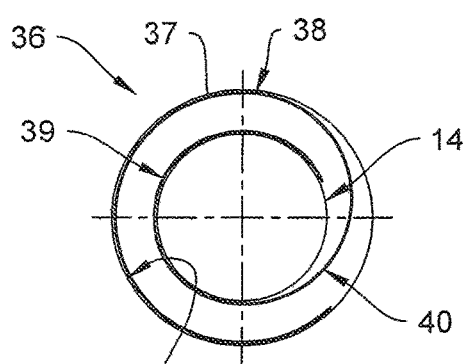
FIG. 5 shows a rolling bearing having a fifth embodiment of a discharge device.

FIG. 5 shows a fifth embodiment of a discharge device 36 having a conductor 37 shaped helical. An external conductor section 38 is essentially adjusted to the outer circumference 14 and to the inner circumference 12 at the internal conductor section 39, a connecting section 40 connecting the external conductor section 38 to the internal conductor section 39 in a helical shape.

Figure 6:
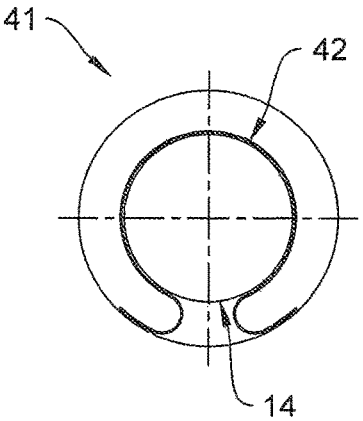
FIG. 6 shows a rolling bearing having a sixth embodiment of a discharge device.

FIG. 6 shows a sixth embodiment of a discharge device, though in comparison to the embodiment of the discharge device shown in FIG. 2, an internal conductor section 42 surrounds the outer circumference 40 to a large extent.

Figure 7:
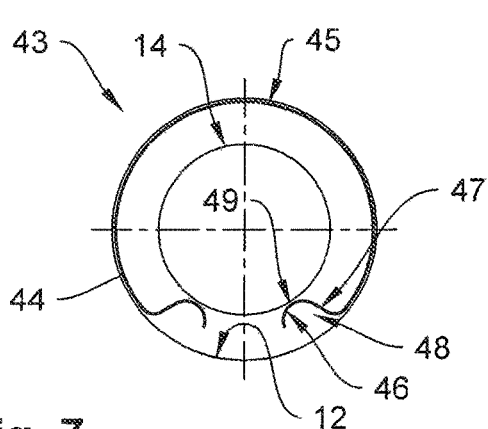
FIG. 7 shows a rolling bearing having a seventh embodiment of a discharge device.

FIG. 7 shows a seventh embodiment of a discharge device 43 having a conductor 44, which comprises a centrally positioned external conductor section 45 and two internal conductor sections 46 at each end 48 of the conductor 44. The internal conductor sections 46 are each connected to the external conductor section 45 via a connecting section 47. The external conductor section 45 is formed essentially arcuately and rests on the inner circumference 12, which is covered by the external conductor section 45 to a large extent. The ends 48 or the internal conductor sections 46, respectively, are formed cranked and rest on contact points 49 at the outer circumference 14. The discharge device 43 is formed symmetrical.

Figure 8:
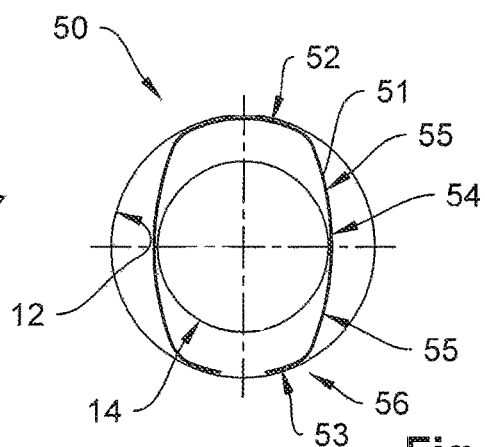
FIG. 8 shows a rolling bearing having an eighth embodiment of a discharge device.

FIG. 8 shows an eighth embodiment of a discharge device 50 having a conductor 51, which comprises an external conductor section 52 as well as two further external conductor sections 53. Two internal conductor sections 54 are each connected to the external conductor sections 52 and 53, respectively, via connecting sections 55. The external conductor sections 53 in particular are each formed at ends 56 of the conductor 51. The external conductor sections 52 and 53 in particular are each formed arcuately and rest on the inner circumference 12. The internal conductor sections 54 rest tangential on the outer circumference 14.

Figure 9:
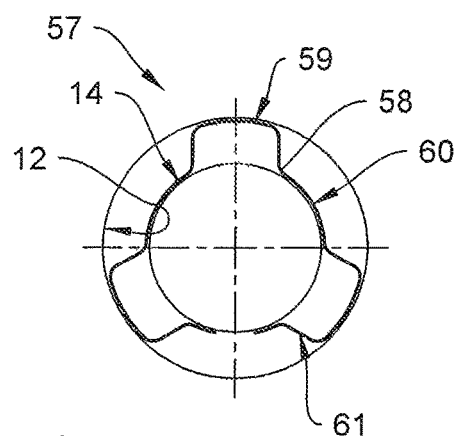
FIG. 9 shows a rolling bearing having a ninth embodiment of a discharge device.

A ninth embodiment of a discharge device 57 is shown in FIG. 9, a conductor 58 being formed essentially like a wave in this instance. The conductor 58 alternatingly forms external conductor sections 59, internal conductor sections 60 and connecting sections 61 connecting the external and internal conductor sections to each other. The external conductor sections 59 and the internal conductor sections 60 are in turn shaped arcuately and essentially adjusted to the inner circumference 12 and the outer circumference 14.

Figure 10:
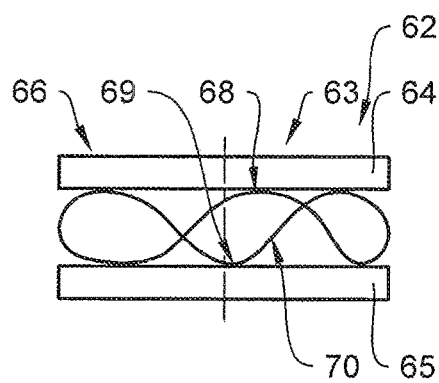
FIG. 10 shows a rolling bearing having a tenth embodiment of a discharge device.
Figure 11:
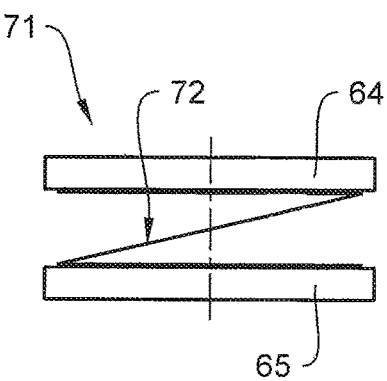
FIG. 11 shows a rolling bearing having an eleventh embodiment of a discharge device.

FIGS. 10 and 11 show a rolling bearing 62 formed as a thrust bearing. The thrust bearing 63 is shown having a first bearing ring 64 and a second bearing ring 65 without balls in a schematically simplified manner in this instance.

FIG. 10 shows a tenth embodiment of a discharge device 66 having a conductor 67 shaped like a wave, each conductor 67 comprising first conductor sections 68 due to the wave-shaped arrangement of the conductor 67, second conductor sections 69 following the first conductor sections, which are connected to the second conductor sections 69 via connecting sections 70. The conductor 67 is formed continuously.

FIG. 11 shows an eleventh embodiment of the discharge device 71 comprising a helically shaped conductor 72. The helically shaped conductor 72 is formed in the manner of a coiled spring and is arranged between the bearing rings 64 and 65.

Figure 12:
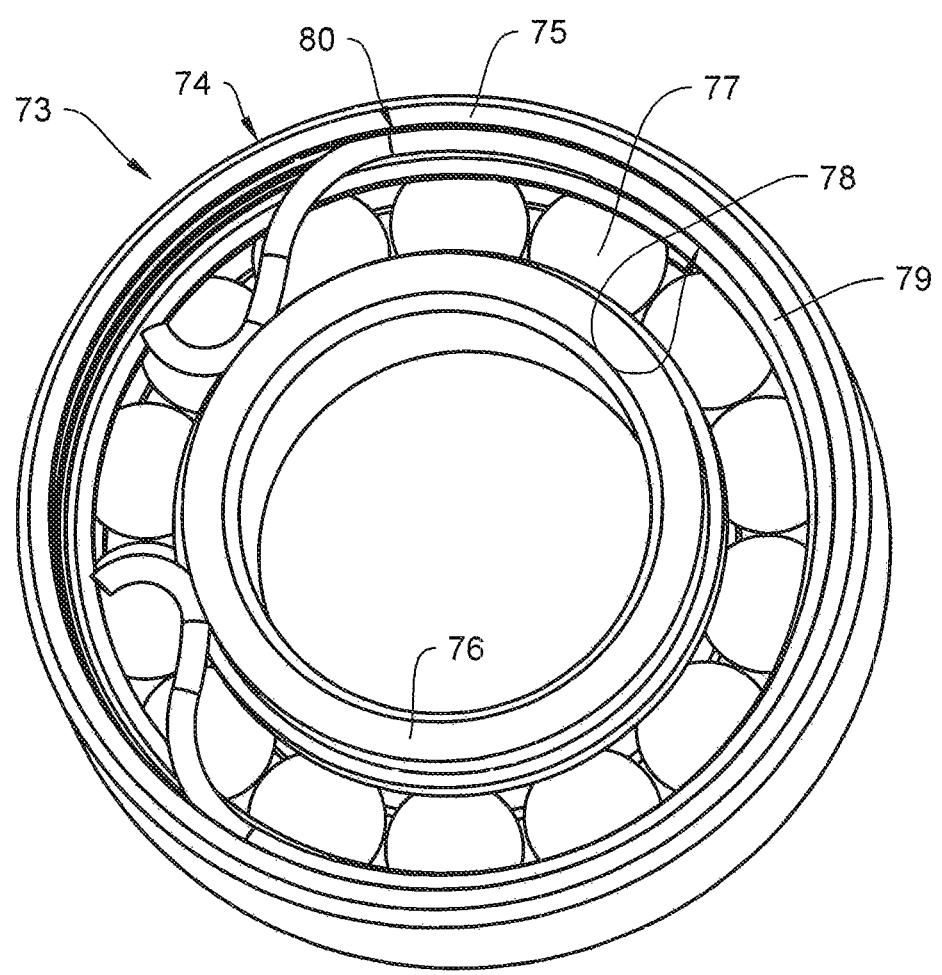
FIG. 12 shows a radial deep groove ball bearing having a twelfth embodiment of a discharge device in a perspective view.

FIG. 12 shows a rolling bearing 73 realized as a deep groove ball bearing 74. Balls 77 are arranged between an outer ring 75 and an inner ring 76. A groove 78 is formed in the outer ring 75, a discharge device 80 formed as a conductor 79 inserted into the groove 78. The discharge device 80 is formed essentially similar to the discharge device shown in FIG. 7.

Figure 13:
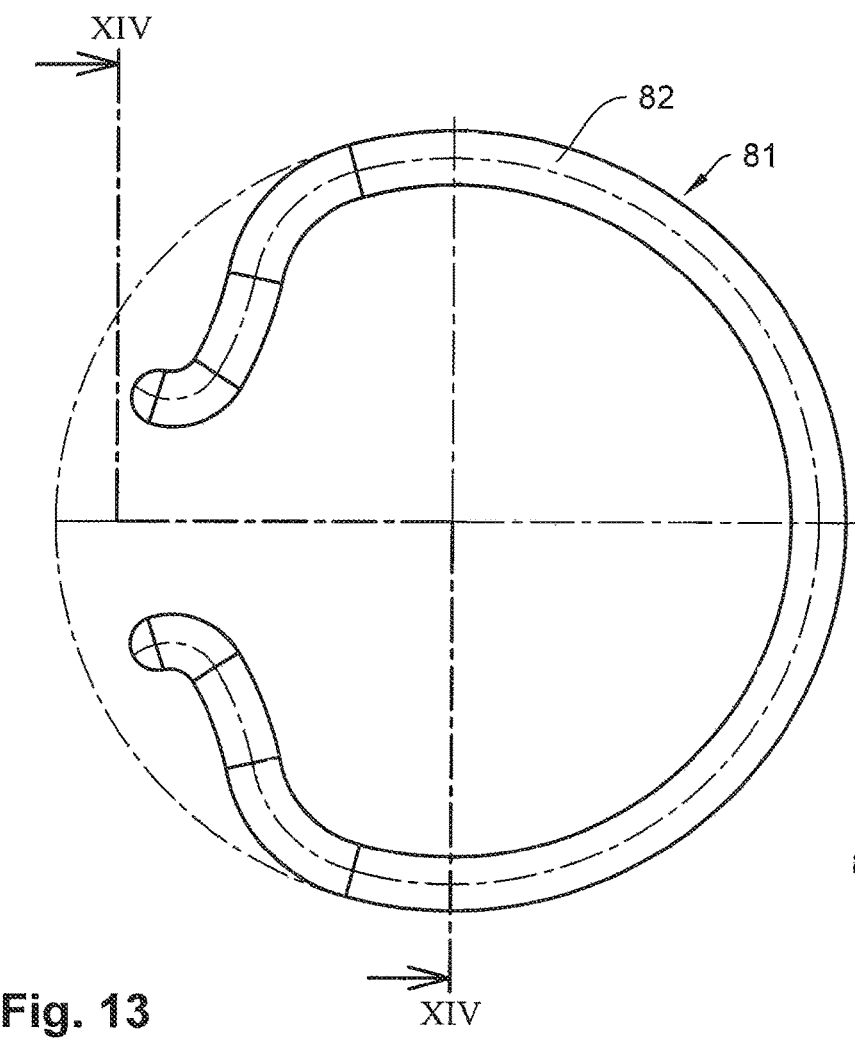
FIG. 13 shows a thirteenth embodiment of a discharge device in a top view.
Figure 14:
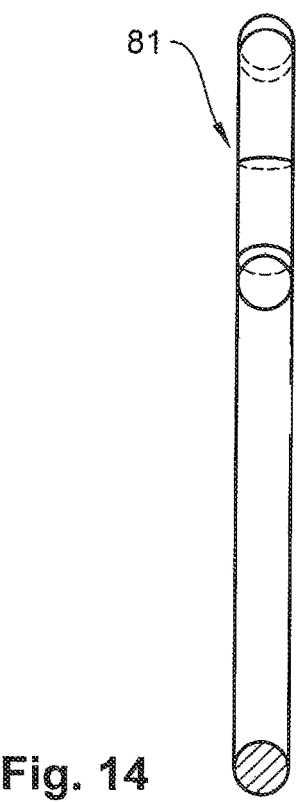
FIG. 14 shows a sectional view of the discharge device from FIG. 13 along a line XIV-XIV.

A synopsis of FIGS. 13 and 14 shows a discharge device 81 in different views. A cross section of a conductor 82 of the discharge device 81 is formed circular.

Figure 15:
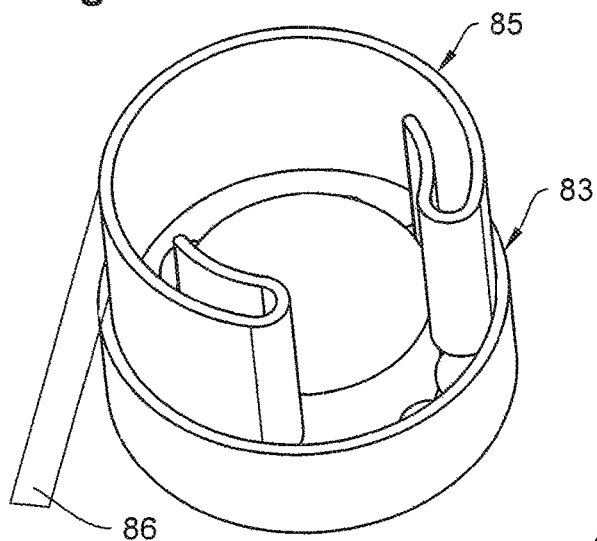
FIG. 15 shows a radial deep groove ball bearing having a fabric panel in a perspective view.
Figure 16:
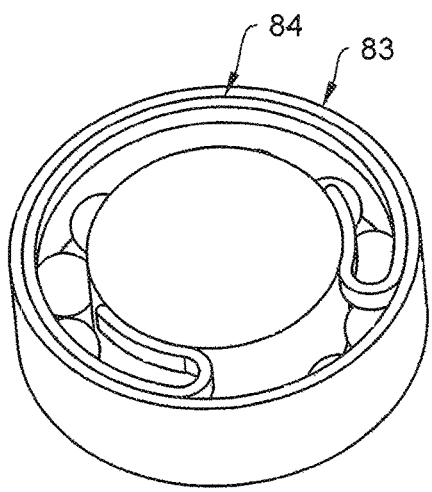
FIG. 16 shows the radial deep groove ball bearing having a fourteenth embodiment of a discharge device in a perspective view.
Figure 17:
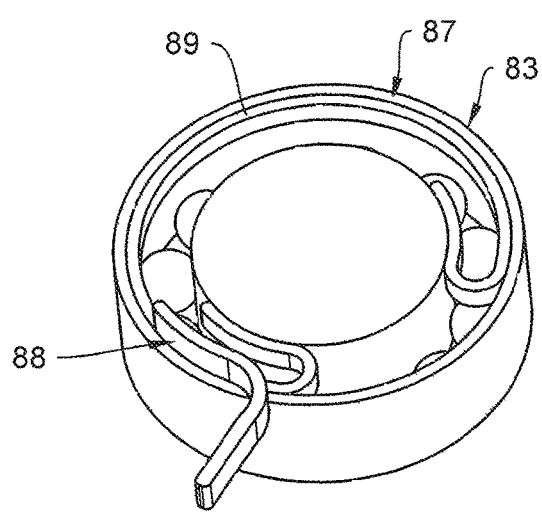
FIG. 17 shows the radial deep groove ball bearing having a fifteenth embodiment of a discharge device in a perspective view.

A synopsis of FIGS. 15 and 16 shows a rolling bearing 83 having a discharge device 84. The discharge device 84 is made of the form-stable fabric panel 85 made of carbon fibers shown in FIG. 15, said discharge device 84 being, separated from the fabric panel 85, after the fabric panel 85 was stabilized in form, by being coated with pyrolytically deposited carbon in the plane 86 indicated in this instance. FIG. 17 shows the rolling bearing 83 having a discharge device 87, an external conductor section 88 of a conductor 89 of the discharge device 87 being extracted from the rolling bearing 83 in this instance. The external conductor section 88 can thus be contacted to another grounding conductor not further shown.

Figure 18:
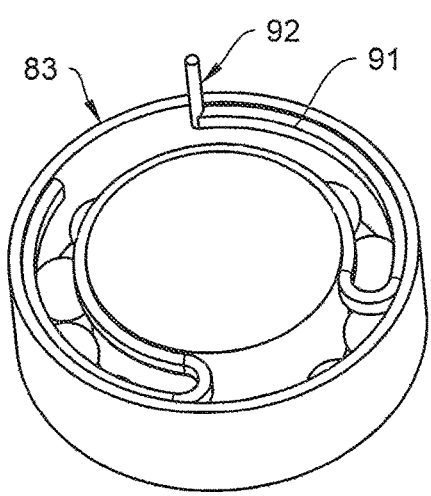
FIG. 18 shows the radial deep groove ball bearing having a sixteenth embodiment of a discharge device in a perspective view.

FIG. 18 shows the rolling bearing 83 having a discharge device 90, a conductor 91 made of a metallic material being formed in this instance and forming an external conductor section 92, which is also extracted from the rolling bearing 83.

The invention claimed is:

1. A discharge device for a rolling bearing, said discharge device comprising:
a flexurally elastic conductor including a first conductor section and a second conductor section for forming a contact arrangement at a rolling bearing, said first conductor section being formed for contacting a first bearing ring and said second conductor section being formed for contacting a second bearing ring of the rolling bearing, an electrically conductive connection being formed between the first bearing ring and the second bearing ring by the conductor, wherein the conductor is made of a carbon fiber arrangement, said carbon fiber arrangement of the conductor including a fiber braid, a fiber felt and/or a fiber mat, which is provided with a coating of pyrolytically deposited carbon.

2. The discharge device according to claim 1, in which the first conductor section and the second conductor section are connected to each other so as to form one piece via a connecting section.

3. The discharge device according to claim 1, in which an initial load formed in the conductor urges said conductor arranged between the first bearing ring and the second bearing ring into engagement with said first bearing ring and said second bearing ring.

4. The discharge device according to claim 1, in which the rolling bearing is a thrust bearing.

5. The discharge device according to claim 1, in which the rolling bearing is a radial bearing, the first conductor section is an external conductor section and the second conductor section is an internal conductor section, the first bearing ring is an outer ring and the the second bearing ring is an inner ring.

6. The discharge device according to claim 5, in which the conductor is arranged between the inner ring and the outer ring, said external conductor section contacting an inner circumference of the outer ring and the internal conductor section contacting an outer circumference of the inner ring.

7. The discharge device according to claim 5, in which the conductor is formed for contacting contact areas of the inner ring and the outer ring, said contacting areas being arranged in a bearing contact plane.

8. The discharge device according to claim 5, in which at least one conductor section is movably received in a radial groove formed in the outer ring or in the inner ring.

9. The discharge device according to claim 5, in which the conductor includes a conductor section formed at least arcuately, which rests on an inner circumference of the outer ring and/or an outer circumference of the inner ring.

10. The discharge device according to claim 5, in which the conductor is U-shaped or V-shaped.

11. The discharge device according to claim 5, in which the conductor is symmetrical having two external conductor sections and an internal conductor section or having one external conductor section and two internal conductor sections.

12. The discharge device according to claim 5, in which the internal conductor section is tangential to an outer circumference of the inner ring.

13. The discharge device according to claim 5, in which the conductor is helical.

14. The discharge device according to claim 5, in which the conductor is wave shaped.

15. The discharge device according to claim 1, in which at least two conductor sections are formed for contacting contact areas, each of said conducting sections being spaced relative to each other in a circumferential direction.

16. The discharge device according to claim 1, in which at least one conductor section is extracted from the rolling bearing in such a manner that the conductor section can be contacted to another conductor.

17. The discharge device according to claim 1, in which the carbon fiber arrangement is formed as a casing of a unidirectional fiber strand extending in the longitudinal direction of the conductor.

18. The discharge device according to claim 1, in which the carbon fiber arrangement has a rectangular, a polygonal or an elliptic cross section, said carbon fiber arrangement being made of a tube-shaped braid, a tube-shaped band or formed as a cutting of a form-stable fabric panel.

19. The discharge device according to claim 1, in which the carbon fiber arrangement includes a resin matrix.

20. The discharge device according to claim 1, in which the carbon fiber arrangement includes a coating for reducing a coefficient of friction.

21. A rolling bearing comprising a discharge device according to claim 1.

22. A usage of a discharge device according to claim 1 arranged in a rolling bearing having a first bearing ring, a second bearing ring and rolling elements arranged between the bearing rings, an electrically conductive connection being formed between the first bearing ring and the second bearing ring by the conductor.

23. A method for discharging electrostatic charges at a rolling bearing having and a flexurally elastic conductor, said conductor being formed having a first conductor section and a second conductor section, which form a contact arrangement at a rolling bearing, said first conductor section being arranged at a first bearing ring and the second conductor section being arranged at a second bearing ring of the rolling bearing in such a manner that an electrically conductive connection is formed between the first bearing ring and the second bearing ring by the conductor, the conductor being made of a carbon fiber arrangement, said carbon fiber arrangement of the conductor including a fiber braid, a fiber felt and/or a fiber mat, which is provided with a coating of pyrolytically deposited carbon, said method comprising:

discharging an electrostatic charge through said conductor.

* * * * *